United States Patent
Takazawa

(12) 
(10) Patent No.: US 7,164,985 B2
(45) Date of Patent: Jan. 16, 2007

(54) VEHICLE-DIRECTION ESTIMATING DEVICE, AND DRIVING CONTROL DEVICE INCLUDING THE VEHICLE-DIRECTION ESTIMATING DEVICE

(75) Inventor: Atsuyoshi Takazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 370 days.

(21) Appl. No.: 10/923,426

(22) Filed: Aug. 20, 2004

(65) Prior Publication Data
US 2005/0043882 A1  Feb. 24, 2005

(30) Foreign Application Priority Data
Aug. 21, 2003  (JP)  ............... 2003-297997

(51) Int. Cl.
- G01C 21/00 (2006.01)
- B62D 6/00 (2006.01)
- G06F 17/00 (2006.01)

(52) U.S. Cl. .............. 701/200; 701/213; 701/215; 342/357.03; 342/357.08; 340/988

(58) Field of Classification Search .......... 701/72, 701/200, 213, 215, 217, 209, 23, 29; 342/352, 342/357.01, 357.03, 357.05, 357.06, 357.08, 342/357.12; 340/988; 455/456.1, 456.5
See application file for complete search history.

(56) References Cited

U.S. PATENT DOCUMENTS

| | | | |
|---|---|---|---|
| 5,233,526 A * | 8/1993 | Detriche et al. | 701/26 |
| 5,471,385 A * | 11/1995 | Suzuki et al. | 701/23 |
| 5,729,457 A * | 3/1998 | Seymour | 455/456.5 |
| 5,794,166 A * | 8/1998 | Bauer et al. | 701/23 |
| 5,928,299 A | 7/1999 | Sekine | |
| 6,223,124 B1 * | 4/2001 | Matsuno et al. | 701/209 |
| 6,266,582 B1 * | 7/2001 | Bruckner | 701/4 |
| 6,681,180 B1 * | 1/2004 | Bevly et al. | 701/213 |
| 2003/0149512 A1 | 8/2003 | Hrovat | |

FOREIGN PATENT DOCUMENTS

| | | |
|---|---|---|
| DE | 19829582 | 9/2000 |
| JP | 2003-026017 | 1/2003 |
| WO | WO 02/103366 | 12/2002 |

OTHER PUBLICATIONS

European Search Report Issued Jun. 2, 2006 for the related applicaiton.

* cited by examiner

*Primary Examiner*—Tan Q. Nguyen
(74) *Attorney, Agent, or Firm*—Smith, Gambrell & Russell

(57) ABSTRACT

A vehicle serving as a moving station includes two GPS antennas disposed away from one another along the longitudinal direction within the vehicle. For automatic steering in the automatic-driving control mode, for a planning route with a small radius of curvature, the direction of the vehicle is estimated to be the direction passing through the positions of the front and rear portions of the vehicle. Otherwise, the direction of the vehicle is estimated to be the direction passing through the current position of the vehicle and the previous position thereof, approximately the length of the vehicle behind the current position. Driving of the vehicle is controlled based upon the current position of the vehicle and the planning route using the estimated direction of the vehicle. Thus, the direction of the vehicle is estimated with high precision appropriately corresponding to each driving situation, thereby enabling precise and stable driving control.

11 Claims, 6 Drawing Sheets

VEHICLE-DIRECTION ESTIMATING DEVICE, AND DRIVING CONTROL DEVICE INCLUDING THE VEHICLE-DIRECTION ESTIMATING DEVICE

This application claims benefit of Japanese Application No. 2003-297997 filed on Aug. 21, 2003, the contents of which are incorporated by this reference.

BACKGROUND OF THE INVENTION

1. Field of the Invention

The present invention relates to a direction-estimating device of a vehicle for estimating the direction of the vehicle based upon: the position of the vehicle calculated based upon signals from artificial satellites; and a planning route set on a map or the like, and a driving control device including the aforementioned direction-estimating device.

2. Description of the Related Art

In recent years, navigation devices are widely used for vehicles, which employ a Global Positioning System (GPS) for detecting the position of the vehicle based upon the position data received from artificial satellites. Furthermore, various techniques have been proposed and put into practical use, wherein driving of the vehicle is controlled based upon the vehicle-position information obtained by the GPS.

For example, a device is disclosed in Japanese Unexamined Patent Application Publication No. 2003-26017, wherein the position of the vehicle is calculated based upon information from the GPS, a planning route along which the vehicle is to be driven is calculated, and the viewing distance is computed based upon the steering-frequency response. With the aforementioned automatic steering technique, the future-position lateral deviation of the vehicle corresponding to the viewing-distance point from the planning route is computed based upon the moving vector of the vehicle, and the current-position lateral deviation of the vehicle from the planning route is computed. Subsequently, the target amount-of-change of steering angle is computed based upon the aforementioned current-position lateral deviation and future-position lateral deviation for steering such that the vehicle follows the planning route, whereby steering is made according to the command value determined based upon the computed target amount-of-change of steering angle.

With such a technique as disclosed in the aforementioned Japanese Unexamined Patent Application Publication No. 2003-26017, the future-position lateral deviation is computed based upon the moving vector of the vehicle. Accordingly, the moving vector of the vehicle calculated with inaccuracy leads to the future-position lateral deviation with insufficient precision, resulting in automatic steering with insufficient precision.

The present invention has been made in order to solve the aforementioned problems, and accordingly, it is an object thereof to provide a direction-estimating device for precisely estimating the direction of the vehicle appropriately corresponding to each driving situation, and a driving-control device including the aforementioned direction-estimating device, thereby enabling precise and stable control of driving of the vehicle.

SUMMARY OF THE INVENTION

A direction estimating device for a vehicle according to the present invention comprises: first vehicle-position detecting means for detecting a first position of the vehicle based upon information received from satellites orbiting the Earth; second vehicle-position detecting means for detecting a second position of the vehicle, differing from the first position of the vehicle, based upon information received from the satellites orbiting the Earth; planning-route setting means for setting a planning route which the vehicle is to be driven; radius-of-curvature computing means for computing the radius of curvature of the planning route; and vehicle-direction estimating means for estimating the direction of the vehicle based upon the moving vector of the vehicle plotted by the first position and the second position in a case of the radius of curvature of the planning route less than a predetermined threshold.

The above and other objects, features and advantages of the invention will become more clearly understood from the following description referring to the accompanying drawings.

DESCRIPTION OF THE PREFERRED EMBODIMENTS

Description will be made below regarding an embodiment according to the present invention with reference to FIGS. 1 through 7.

Figure 1:
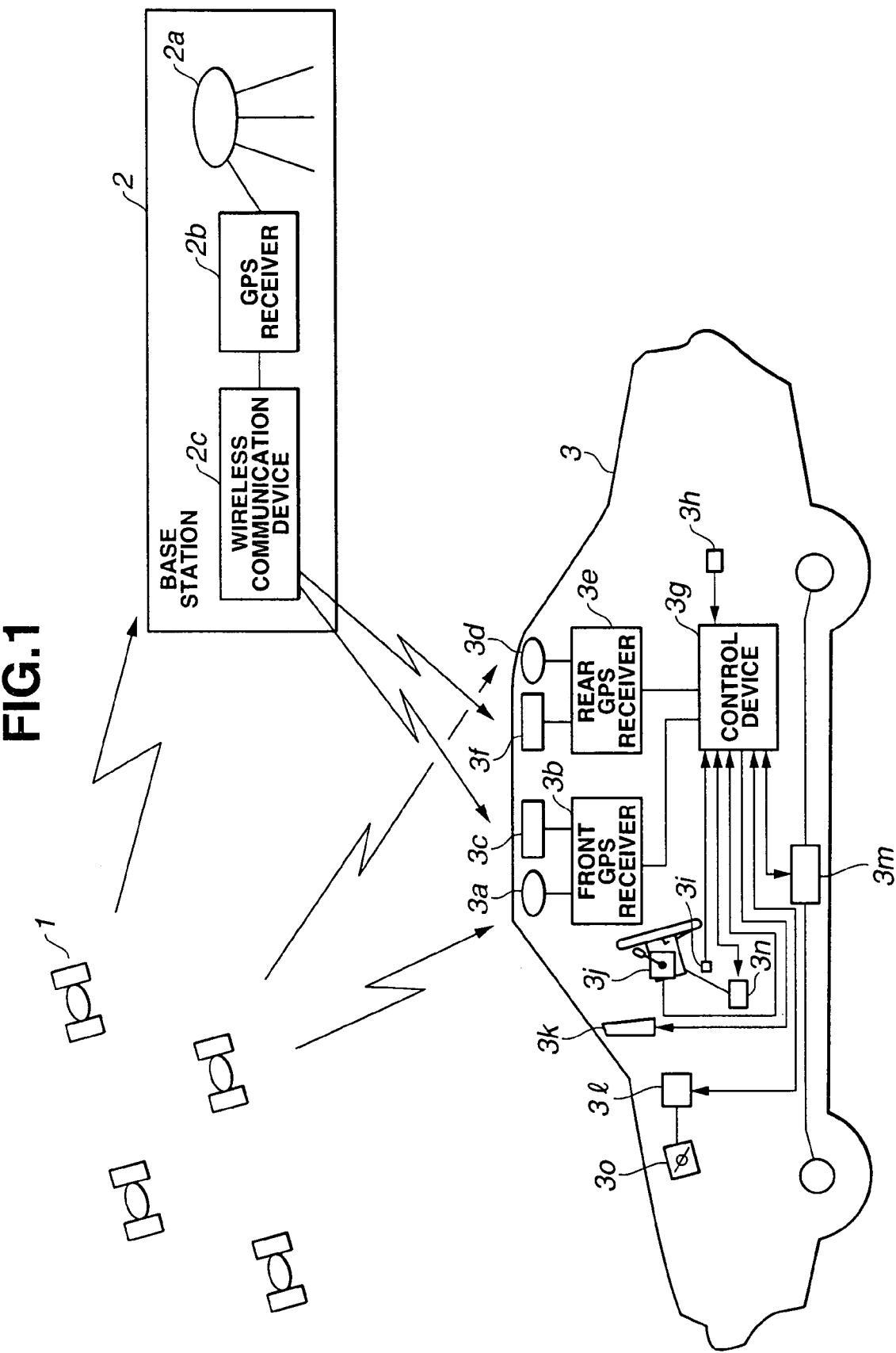
FIG. 1 is a schematic explanatory diagram which shows an overall configuration of a driving control device for a vehicle.

As shown in FIG. 1, with the present embodiment, a GPS known as a RTK (Real-Time Kinetic) GPS is employed. That is to say, the information (data such as satellite-orbit information for performing positioning calculation and so forth) from artificial satellites (GPS satellites) 1 orbiting the Earth is received by a base station 2 and a vehicle 3 serving as a moving station (including two receivers, as described later).

The base station 2 is installed at a position which has been measured beforehand with sufficient precision, and principally includes a GPS antenna 2a, a GPS receiver 2b, and a wireless communication device 2c. The base station 2 transmits the phase information with regard to the radio wave from the GPS satellites 1, the pseudo range, and the position coordinates of the base station 2, to a point which is to be measured, i.e., the vehicle 3 including two receivers serving as the moving station, using the wireless communication device 2c. Specifically, the data transmitted from the base station 2 to the vehicle 3 includes: error correction data; pseudo-range correction data; and the position coordinates of the base station 2.

The vehicle 3 includes a GPS antenna 3a, a GPS receiver 3b, and a wireless communication device 3c, on a front portion along the longitudinal direction and generally on the middle portion along the lateral direction in the vehicle interior. Furthermore, the vehicle 3 includes a GPS antenna 3d, a GPS receiver 3e, and a wireless communication device 3f, on a rear portion along the longitudinal direction and generally on the middle portion along the lateral direction in the vehicle interior. Note that the GPS antennas 3a and 3d are disposed away from one another so as to detect the difference between the positions thereof, giving consideration to the margin of error of the RTK-GPS. For example, with the RTK-GPS with a maximum margin of error of 5 cm, the GPS antennas 3a and 3d are disposed on the front and rear portions 10 cm or more away from one another.

The front GPS receiver 3b calculates the position (position coordinates) of the front portion of the vehicle with high precision (e.g., margin of error of 1 to 5 cm) in real time by analyzing the error correction data, the pseudo-range correction data, and the position coordinates of the base station 2, received from the base station 2 (data received through the wireless communication device 3c) and the information directly received from the. GPS satellites 1. As described above, the GPS receiver 3b has a function as first vehicle-position detecting means for detecting a first position (i.e., the position of the GPS antenna 3a disposed on the front portion) of the vehicle.

In the same way, the rear GPS receiver 3e calculates the position (position coordinates) of the rear portion of the vehicle with high precision (e.g., margin of error of 1 to 5 cm) in real time by analyzing the error correction data, the pseudo-range correction data, and the position coordinates of the base station 2, received from the base station 2 (data received through the wireless communication device 3f) and the information directly received from the GPS satellites 1. As described above, the GPS receiver 3e has a function as second vehicle-position detecting means for detecting a second position (i.e., the position of the GPS antenna 3d disposed on the rear portion) of the vehicle.

Thus, with the vehicle 3, the position of the front portion of the vehicle is obtained by actions of the GPS antenna 3a, the GPS receiver 3b, and the wireless communication device 3c, and the position of the rear portion of the vehicle is obtained by actions of the GPS antenna 3d, the GPS receiver 3e, and the wireless communication device 3f. Note that the position of the front portion of the vehicle represents the position of the vehicle.

Furthermore, the vehicle 3 includes planning-route setting means, radius-of-curvature computing means, vehicle-direction estimating means, and a control device 3g having a function as vehicle-control-information computing means. The control device 3g is connected to the front GPS receiver 3b and the rear GPS receiver 3e through an unshown serial-CAN converter or the like for receiving the information with regard to the current positions of the front and rear portions of the vehicle. Furthermore, the control device 3g is connected to sensors such as a speed sensor 3h for detecting the speed V of the vehicle, a steering-angle sensor 3i for detecting the steering angle θH, and so forth, and a main switch 3j for switching to an automatic-driving control mode.

Furthermore, the control device 3g of the vehicle 3 includes an unshown storage medium such as a hard disk, CD, DVD, or the like, which has map information stored therein necessary for the automatic-driving control. The map information is suitably displayed on a liquid crystal display 3k mounted on a dash board thereof, for example. Upon the user inputting a destination through an unshown remote-control device or the like, the current vehicle position and the optimum route (the planning route which a node line yields) from the current position to the destination are displayed on a map shown on the liquid crystal display 3k.

Furthermore, the control device 3g of the vehicle 3 is connected to actuators for performing the automatic-driving control, such as an electric throttle control device 3l, a brake control device 3m, and an electric power steering control device 3n.

Upon the user turning on the main switch 3j for switching to the automatic-driving control mode, and setting the speed of the vehicle in the automatic-driving control mode, the control device 3g outputs signals to the electric throttle control device 3l so as to drive a throttle 3o such that the vehicle is accelerated or decelerated in order to maintain the set speed of the vehicle. Furthermore, in the event that deceleration of the vehicle must be made beyond a predetermined deceleration, the control device 3g outputs signals to the brake control device 3m so as to operate automatic braking.

Figure 2:
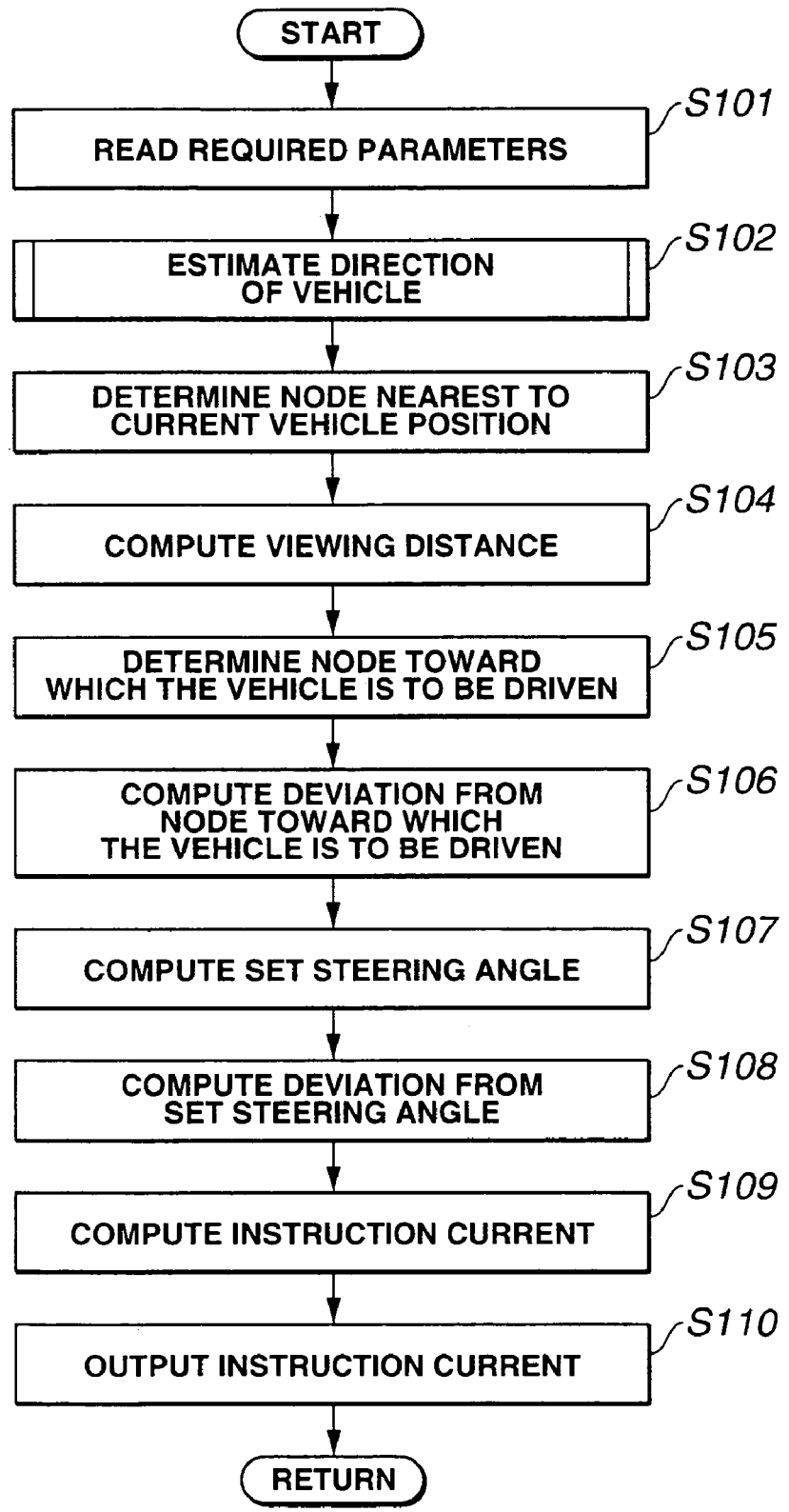
FIG. 2 is a flowchart which shows processing for automatic steering in automatic-driving control mode.
Figure 3:
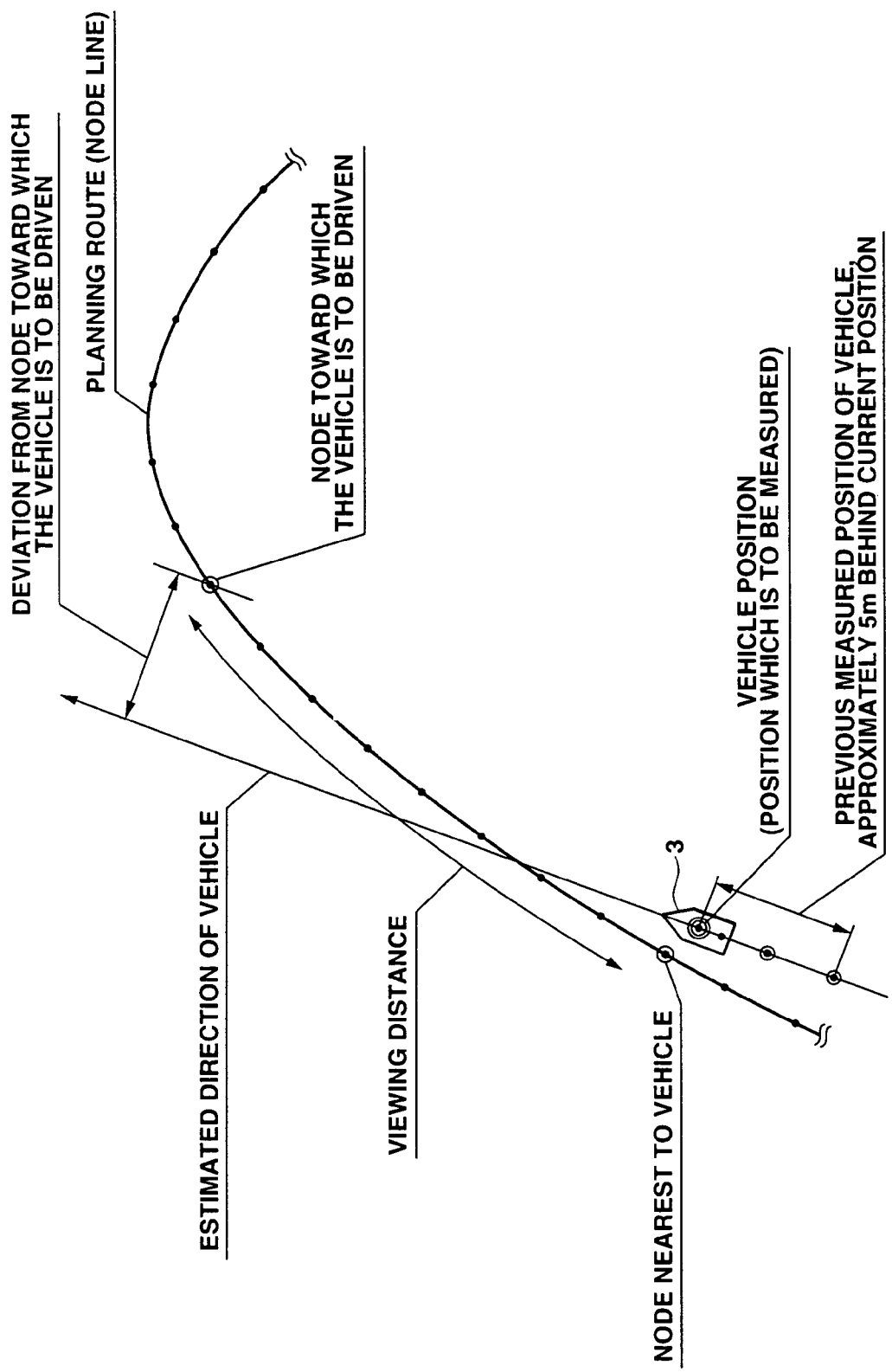
FIG. 3 is an explanatory diagram for describing the mechanism of the automatic steering.

Next, description will be made regarding automatic steering performed in the automatic-driving control mode of the control device 3g of the vehicle 3 with reference to the flowchart shown in FIG. 2 and the explanatory diagram for describing the mechanism of the automatic steering shown in FIG. 3. The flowchart in FIG. 2 shows a program executed at a predetermined intervals of time upon the user turning on the main switch 3j for switching to the automatic-driving control mode. First, in Step 101 (which will be abbreviated to "S101" hereafter), the control device 3g reads the required parameters.

Next, the flow proceeds to S102, where the control device 3g estimates the direction of the vehicle according to a vehicle-direction estimating routine described later. The control device 3g extracts the direction of the vehicle to be the direction passing through the positions of the front and rear portions of the vehicle, or the previous position of the vehicle, approximately the length of the vehicle (e.g., 5 m) behind the current position (the current position of the front portion thereof) from vehicle-position-history information and estimates the direction of the vehicle to be the direction passing through the current position of the vehicle and the previous position thereof, 5 m behind the current position thereof.

Next, the flow proceeds to S103, where the control device 3g extracts the node on the planning route nearest to the current position of the vehicle.

Subsequently, the flow proceeds to S104, where the control device 3g calculates the viewing distance based upon the current speed of the vehicle and a predetermined viewing time (e.g., 1.5 sec). For example, in the event that the current speed of the vehicle is 20 km/h, the viewing distance is 5.56 m×1.5 sec=8.34 m.

Subsequently, the flow proceeds to S105, where the control device 3d determines a node on the planning route, which is approximately the viewing distance calculated in S104 in front of the current position of the vehicle, and sets the node thus determined as a node toward which the vehicle is to be driven.

Next, the flow proceeds to S106, the control device 3g computes the lateral deviation of the direction of the vehicle from the node toward which the vehicle is to be driven, as the node deviation ΔD.

Next, the flow proceeds to S107, where the control device 3g calculates the steering angle δh such that the node deviation ΔD becomes zero using Expression (1) described below.

$$\delta h = Gp \cdot \Delta D + Gd \cdot (d(\Delta D)/dt) \qquad (1)$$

Note that Gp represents a proportional gain, and Gd represents a differential gain.

Next, the flow proceeds to S108, where the control device 3g computes the steering-angle deviation Δδ (=δh−θH) based upon the calculated steering angle δh and the actual steering angle θH detected by the steering-angle sensor 3i.

Subsequently, the flow proceeds to S109, where the control device 3g computes an instruction current Iδ for being applied to an electric power steering motor of the electric power steering control device 3k such that the steering-angle deviation Δδ becomes zero using Expression (2) described below. Subsequently, the flow proceeds to S110, where the control device 3g outputs the instruction current Iδ, whereby the routine of the program ends.

$$I\delta = Kp \cdot \Delta\delta + Kd \cdot (d(\Delta\delta)/dt) + Ki \cdot \int \Delta\delta dt \qquad (2)$$

Note that Kp is a proportional gain, Kd is a differential gain, and Ki is an integral gain.

Figure 4:
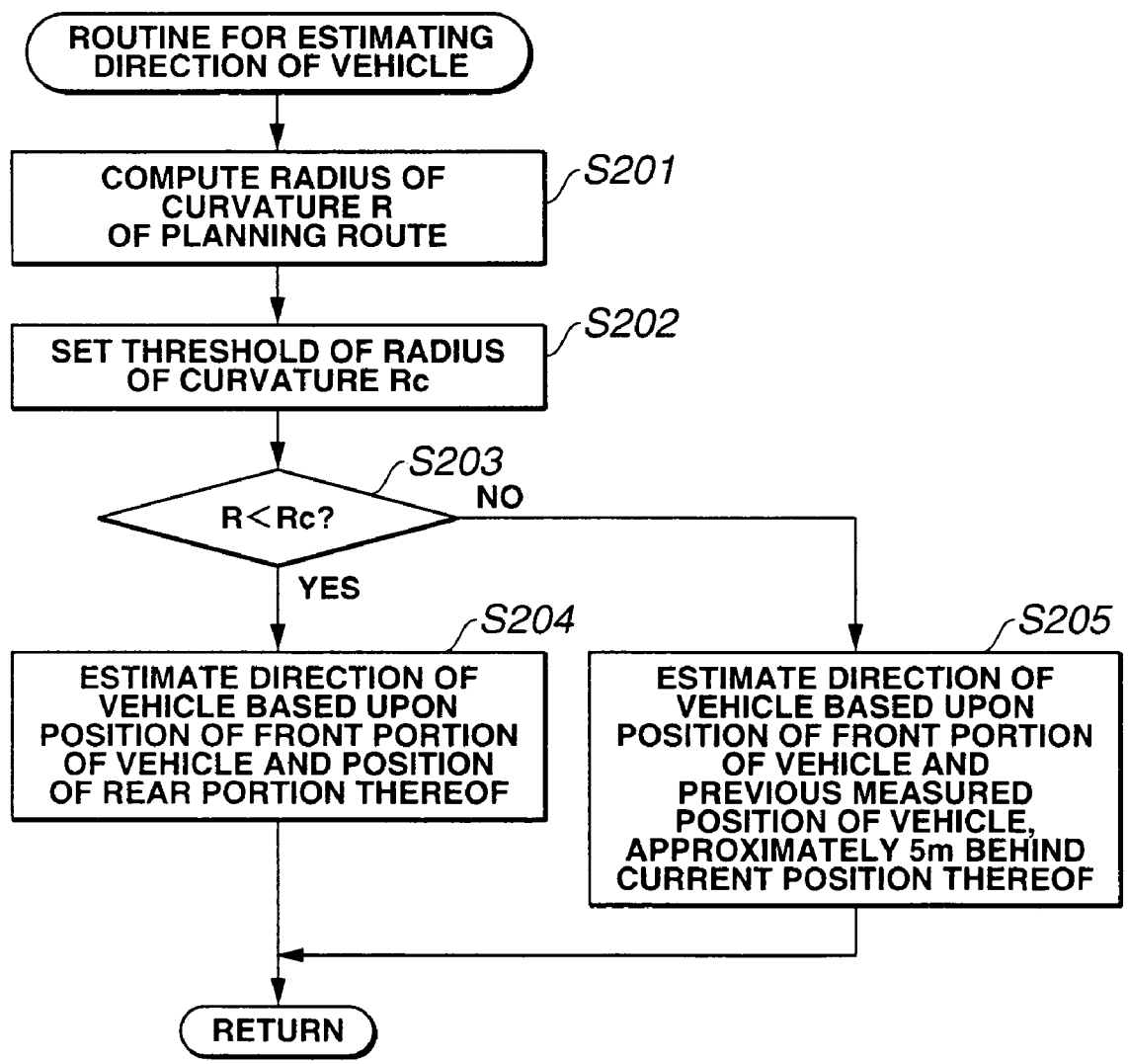
FIG. 4 is a flowchart for describing a vehicle-direction estimating routine.

Next, description will be made regarding the vehicle-direction estimating routine executed in S102 described above with reference to the flowchart shown in FIG. 4.

First, in S201, the control device 3g computes the radius of curvature R of the planning route. For example, the radius of curvature R can be obtained by calculating the radius of the circle passing through the three nodes on the planning route. Note that the control device 3g may select: the node toward which the vehicle is heading, and the nodes adjacent to the aforementioned node; the node nearest to the current position of the vehicle and the nodes adjacent to the nearest nodes; or the node at a position, the predetermined viewing distance in front of the current vehicle position, and the nodes adjacent to the aforementioned node. Now, description will be made regarding an arrangement wherein the control device 3g selects the node toward which the vehicle is heading, and the nodes adjacent to the nearest node.

Figure 5:
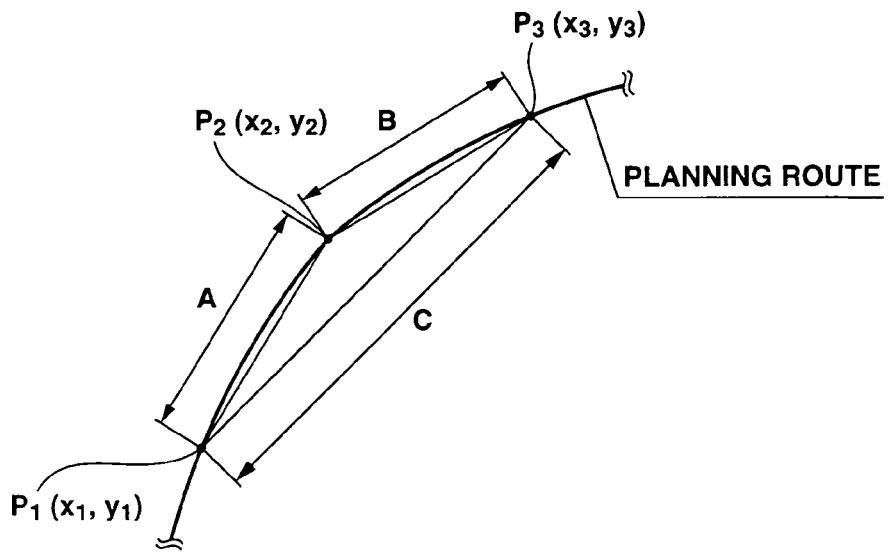
FIG. 5 is an explanatory diagram for describing calculation for the radius of curvature of a planning route.
Figure 6:
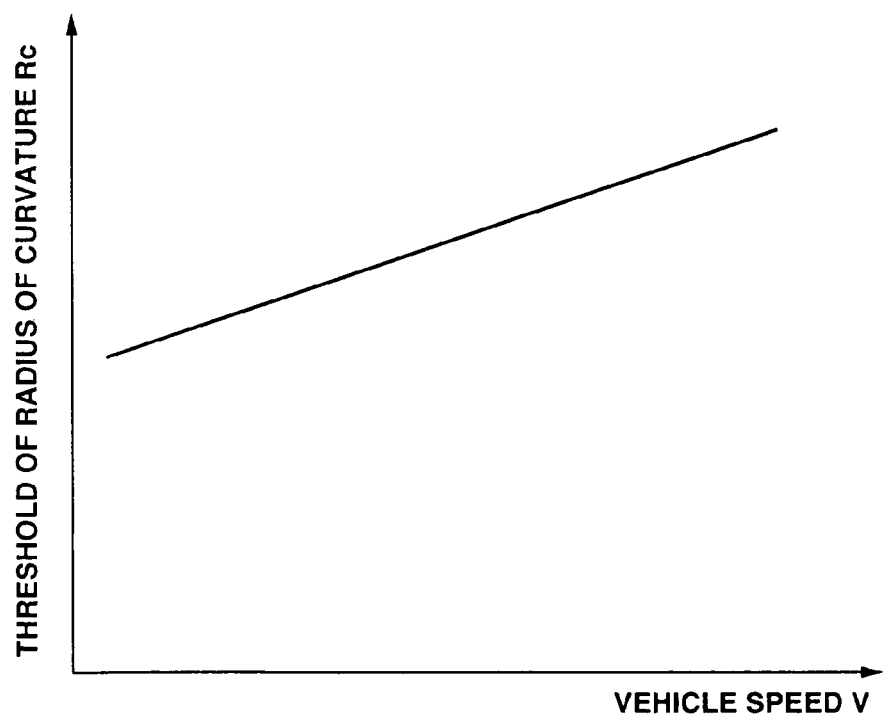
FIG. 6 is an explanatory diagram which shows the relation between the threshold of the radius of curvature and the vehicle speed.
Figure 7B:
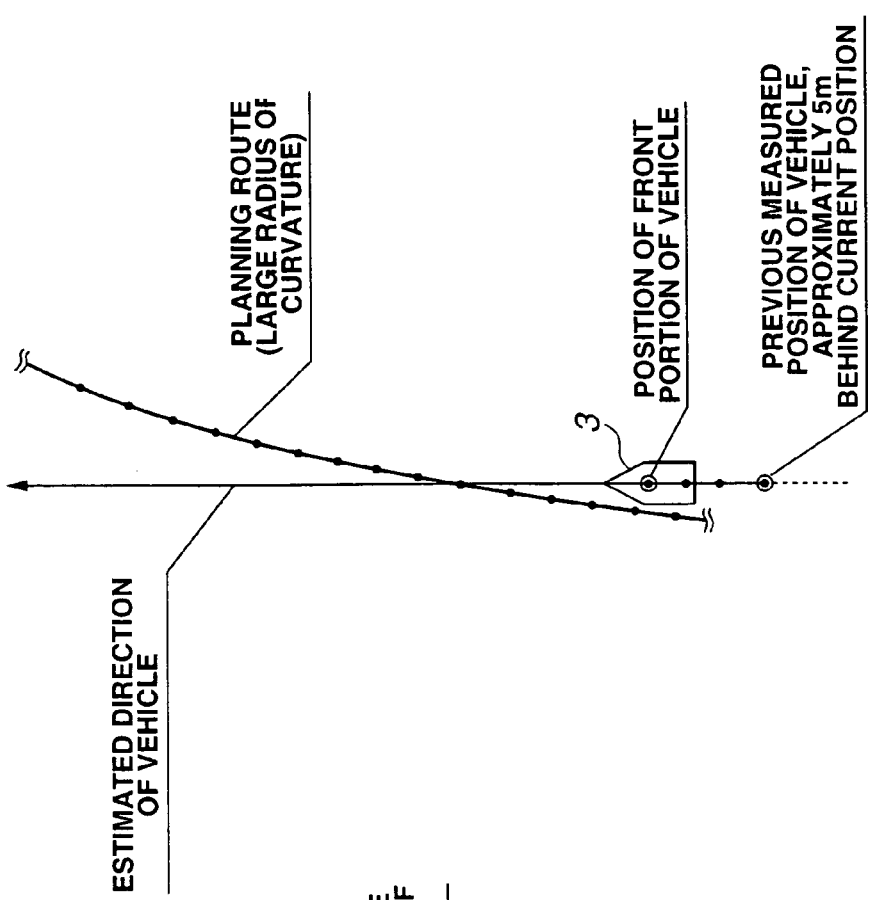
FIG. 7 is an explanatory diagram for describing estimation of the direction of the vehicle.
Figure 7A:
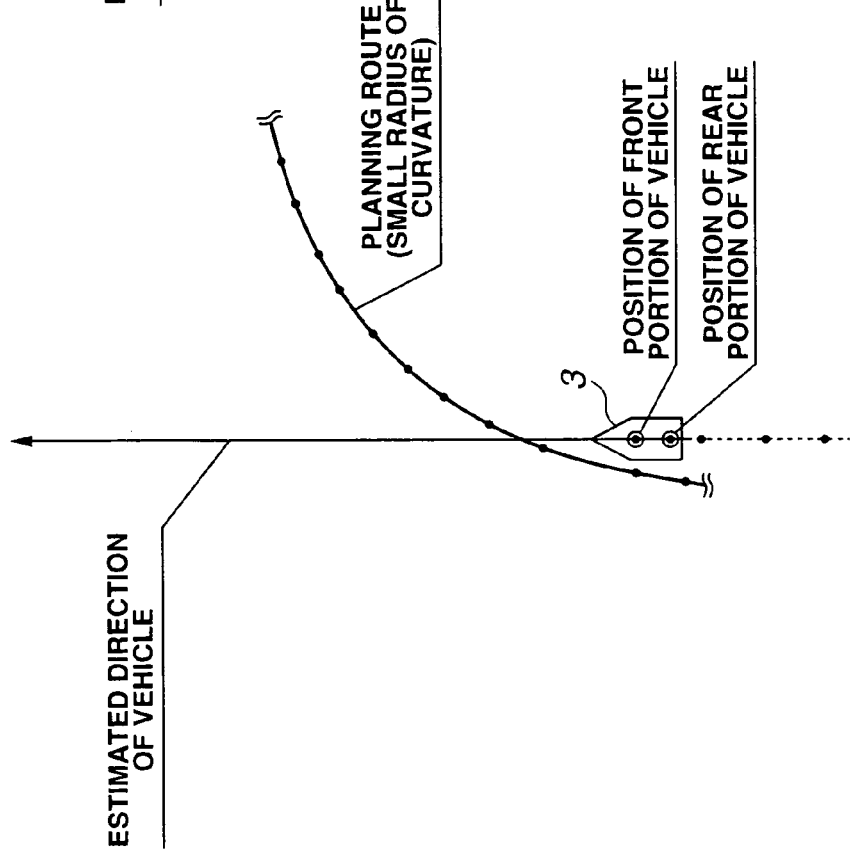

As shown in FIG. 5, the control device 3g selects three nodes of P1(x1, y1), P2(x2, y2), and P3(x3, y3), in the coordinate space of X and Y. In this case, the X axis represents the lateral direction of the vehicle 3, and the Y axis represents the longitudinal direction thereof. Now, with the segment between P1 and P2 as A, with the segment between P2 and P3 as B, and with the segment between P3 and P1 as C, the radius R of the circle passing through the three points of P1, P2, and P3, is calculated by Expression (3) described below.

$$R = (A+B+C)/(4 \cdot Sa) \qquad (3)$$

Note that Sa represents the area of the triangle P1-P2-P3, and is calculated by Expression (4) described below.

$$Sa = (\lambda \cdot (\lambda-A) \cdot (\lambda-B) \cdot (\lambda-C))^{1/2} \qquad (4)$$

Note that λ represents (A+B+C)/2.

On the other hand, the segments A, B, and C are calculated by following Expressions.

$$A = ((y2-y1)^2 + (x2-x1)^2)^{1/2} \qquad (5)$$

$$B = ((y3-y2)^2 + (x3-x2)^2)^{1/2} \qquad (6)$$

$$C = ((y1-y3)^2 + (x1-x3)^3)^{1/2} \qquad (7)$$

Next, the flow proceeds to S202, where the control device 3g sets the radius of curvature Rc as a predetermined threshold. The radius of curvature Rc is determined corresponding to the vehicle speed V. For example, the greater the vehicle speed V is, the greater the radius of curvature is determined as shown in the relation in FIG. 6. Note that the control device 3g may correct the radius of curvature Rc corresponding to situations such as the width of the road and so forth. For example, the control device 3g adds a small correction value to the radius of curvature Rc in a case of a wide road such as an expressway, national road, or the like, based upon map information or the like stored therein. Otherwise, the control device 3g adds a great correction value to the radius of curvature Rc.

Subsequently, the flow proceeds to S203, where the control device 3g makes a comparison between the radius of curvature R of the planning route and the threshold of the radius of curvature Rc. In the event that the control device 3g has determined that the radius of curvature R of the planning route is less than the threshold of the radius of curvature Rc (in a case of R<Rc), the flow proceeds to S204, where the control device 3g estimates the direction of the vehicle to be the direction passing through the positions of the front and rear portions of the vehicle, whereby the routine ends.

Conversely, in the event that the control device 3g has determined that the radius of curvature R of the planning route is equal to or greater than the threshold of the radius of curvature Rc (in a case of R≧Rc) in S203 where comparison is made between the radius of curvature R of the planning route and the threshold of the radius of curvature Rc, the flow proceeds to S205, where the control device 3g extracts the previous position of the vehicle, approximately the length of the vehicle (e.g., 5 m) behind the current position (the current position of the front portion thereof) from vehicle-position-history information and estimates the direction of the vehicle to be the direction passing through the current vehicle position and the previous vehicle position, approximately the length of the vehicle (e.g., 5 m) behind the current vehicle position, whereby the routine ends.

That is to say, in the event that the control device 3g estimates the direction of the vehicle to be the direction passing through the current vehicle position and the previous vehicle position, approximately the length of the vehicle behind the current vehicle position, for the planning route with a small radius of curvature R, there is a problem that the direction of the vehicle 3 may differ between these two positions, leading to a problem that the node deviation ΔD from the node toward which the vehicle is to be driven may be calculated with insufficient precision. Accordingly, in this case, the control device 3g estimates the direction of the vehicle to be the direction passing through the positions of the front and rear portions of the vehicle.

On the other hand, in the event that the control device 3g estimates the direction of the vehicle to be the direction passing through the positions of the front and rear portions of the vehicle for the planning route with a large radius of curvature R, slight deviation due to a slight yaw angle occurring in the vehicle 3 is precisely calculated into a significant value. This leads to a margin of error contained in the steering angle δh calculated based upon the node deviation ΔD from the node toward which the vehicle is to be driven, resulting in undesirable fluctuation in steering of the vehicle (deterioration in straight-driving stability). Accordingly, in this case, the control device 3g estimates the direction of the vehicle to be the direction passing through the current vehicle position and the previous vehicle position, approximately the length of the vehicle behind the current vehicle position.

As described above, with the present embodiment, the control device 3g estimates the direction of the vehicle to be the direction passing through the positions of the front and rear portions of the vehicle for the planning route with a small radius of curvature R, and estimates the direction of the vehicle to be the direction passing through the current vehicle position and the previous vehicle position, approximately the length of the vehicle behind the current vehicle position, for the planning route with a large radius of curvature R, thereby enabling precise estimation of the direction of the vehicle appropriately corresponding to each driving situation. With the present embodiment, driving of the vehicle is controlled based upon the current vehicle position and the planning route using the estimated direction of the vehicle, thereby enabling stable and precise control of driving of the vehicle.

Note that while description has been made regarding an arrangement wherein the GPS antennas 3a and 3d of the moving station are disposed away from one another along the longitudinal direction in the interior of the vehicle 3, the present invention is not restricted to the aforementioned arrangement, rather, the GPS antennas 3a and 3d may be disposed away from one another along the lateral direction. Furthermore, the GPS antennas 3a and 3d may be disposed away from one another on the outside of the vehicle (e.g., disposed within front and rear bumpers). Furthermore, the GPS antennas 3a and 3d may be disposed at any positions away from one another as long as the control device 3g can detect the difference between the positions thereof, and the direction of the vehicle as to the line passing through the positions.

As described above, the present invention enables suitable and precise estimation of the direction of the vehicle corresponding to each driving situation of the vehicle, thereby enabling precise and stable driving control.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A direction estimating device for a vehicle comprising:
    first vehicle-position detecting means for detecting a first position of the vehicle based upon information received from satellites orbiting the Earth;
    second vehicle-position detecting means for detecting a second position of the vehicle, differing from the first position of the vehicle, based upon information received from the satellites orbiting the Earth;
    planning-route setting means for setting a planning route which the vehicle is to be driven;
    radius-of-curvature computing means for computing the radius of curvature of the planning route; and
    vehicle-direction estimating means for estimating the direction of the vehicle to be the direction passing through the first position and the second position in a case of the radius of curvature of the planning route less than a predetermined threshold.

2. The direction estimating device for the vehicle according to claim 1, further comprising vehicle-movement-information computing means for computing information with regard to movement of the vehicle up to the current position thereof based upon the change of the first position or the second position over time,
    wherein the vehicle-direction estimating means estimate the direction of the vehicle by calculating the moving direction of the vehicle based upon the information with regard to movement of the vehicle in a case of the radius of curvature of the planning route exceeding the predetermined threshold.

3. The direction estimating device for the vehicle according to claim 2, wherein the vehicle-direction estimating means estimate the moving direction of the vehicle to be the direction passing through the current vehicle position and the previous vehicle position, approximately the length of the vehicle behind the current vehicle position, in the event that the vehicle-direction estimating means estimate the moving direction of the vehicle based upon the information with regard to movement of the vehicle position.

4. The direction estimating device for the vehicle according to claim 3, wherein the predetermined threshold is changed corresponding to the speed of the vehicle.

5. The driving control device for the vehicle including the direction estimating device for the vehicle according to claim 3, wherein driving of the vehicle is controlled based upon the current position of the vehicle, the estimated direction of the vehicle, and the planning route.

6. The direction estimating device for the vehicle according to claim 2, wherein the predetermined threshold is changed corresponding to the speed of the vehicle.

7. The driving control device for the vehicle including the direction estimating device for the vehicle according to claim 2, wherein driving of the vehicle is controlled based upon the current position of the vehicle, the estimated direction of the vehicle, and the planning route.

8. The direction estimating device for the vehicle according to claim 1, wherein the predetermined threshold is changed corresponding to the speed of the vehicle.

9. The driving control device for the vehicle including the direction estimating device for the vehicle according to claim 8, wherein driving of the vehicle is controlled based upon the current position of the vehicle, the estimated direction of the vehicle, and the planning route.

10. The driving control device for the vehicle including the direction estimating device for the vehicle according to claim 1, wherein driving of the vehicle is controlled based upon the current position of the vehicle, the estimated direction of the vehicle, and the planning route.

11. A vehicle containing the direction estimating device of claim 1.

* * * * *